US008040008B2

(12) United States Patent
Kawamura et al.

(10) Patent No.: US 8,040,008 B2
(45) Date of Patent: Oct. 18, 2011

(54) AXIAL GAP MOTOR

(75) Inventors: Tamotsu Kawamura, Sakura (JP);
Keiichi Yamamoto, Haga-gun (JP);
Hirofumi Atarashi, Shioya-gun (JP);
Shoei Abe, Kawachi-gun (JP); Shigeru Tajima, Tokorozawa (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/680,841

(22) PCT Filed: Oct. 2, 2008

(86) PCT No.: PCT/JP2008/067908
§ 371 (c)(1),
(2), (4) Date: Mar. 30, 2010

(87) PCT Pub. No.: WO2009/044799
PCT Pub. Date: Apr. 9, 2009

(65) Prior Publication Data
US 2010/0219710 A1 Sep. 2, 2010

(30) Foreign Application Priority Data
Oct. 4, 2007 (JP) ................................. 2007-261168

(51) Int. Cl.
*H02K 1/30* (2006.01)
*H02K 23/54* (2006.01)
(52) U.S. Cl. .......... 310/156.32; 310/156.35; 310/156.43
(58) Field of Classification Search ........... 310/156.32–156.37, 156.43
See application file for complete search history.

(56) References Cited

U.S. PATENT DOCUMENTS

| 336,087 | A | 2/1886 | Brush |
| 2,154,146 | A | 4/1939 | Becker |
| 2,632,861 | A | 3/1953 | Morton et al. |
| 3,108,200 | A | 10/1963 | Baldwin |
| 3,465,188 | A | 9/1969 | Sisk |
| 3,591,819 | A | 7/1971 | Laing et al. |
| 3,762,042 | A | 10/1973 | Abe et al. |

(Continued)

FOREIGN PATENT DOCUMENTS

EP 1 612 913 A2 1/2006

(Continued)

OTHER PUBLICATIONS

Z.Q. Zhu, Influence of Design Parameters on Cogging Torque in Permanent Magnet Machines, IEEE Transactions on Energy Conversion, vol. 15, No. 4, Dec. 2000, pp. 407-412.

*Primary Examiner* — Burton Mullins
(74) *Attorney, Agent, or Firm* — Arent Fox LLP

(57) ABSTRACT

The axial gap motor includes the rotor having: a rotor frame including a plurality of ribs extending in a radial direction, an inner circumferential side annular shaft, and an outer circumferential side annular rim, which are integrally coupled to each other through the ribs; the shaft has shaft side rib mounting holes through which the ribs are mounted, the rim has rim side rib mounting holes through which the ribs are mounted, the ribs have radial inner ends mounted and fixed into the shaft side rib mounting holes and radial outer ends mounted and fixed into the rim side rib mounting holes, and in the rotor frame, the main magnets and the sub magnets are alternately disposed in the circumferential direction, between the shaft and the rim.

5 Claims, 8 Drawing Sheets

U.S. PATENT DOCUMENTS

| | | | |
|---|---|---|---|
| 3,956,651 A | 5/1976 | Brammerlo | |
| 4,007,387 A | 2/1977 | Rustecki | |
| 4,095,150 A | 6/1978 | Senckel | |
| 4,363,988 A | 12/1982 | Kliman | |
| 4,410,820 A | 10/1983 | Stanley | |
| 4,864,175 A | 9/1989 | Rossi | |
| 4,996,457 A | 2/1991 | Hawsey et al. | |
| 5,142,179 A | 8/1992 | Nakamura et al. | |
| 5,245,238 A | 9/1993 | Lunchy et al. | |
| 5,334,899 A | 8/1994 | Skybyk | |
| 5,387,854 A | 2/1995 | McCleer et al. | |
| 5,394,321 A | 2/1995 | McCleer et al. | |
| 5,397,953 A | 3/1995 | Cho | |
| 5,642,009 A | 6/1997 | McCleer et al. | |
| 5,671,524 A | 9/1997 | Damskey et al. | |
| 5,731,649 A | 3/1998 | Caamano | |
| 5,757,108 A | 5/1998 | Suzuki | |
| 5,907,210 A | 5/1999 | Chaix | |
| 5,925,965 A | 7/1999 | Li et al. | |
| 5,955,809 A | 9/1999 | Shah | |
| 6,034,459 A | 3/2000 | Matsunobu et al. | |
| 6,373,162 B1 | 4/2002 | Liang et al. | |
| 6,739,034 B2 | 5/2004 | Suzuki et al. | |
| 6,809,453 B2 | 10/2004 | Narita et al. | |
| 6,919,663 B2 | 7/2005 | Iles-Klumpner | |
| 6,960,860 B1 | 11/2005 | DeCristofaro et al. | |
| 6,995,494 B2 | 2/2006 | Haugan et al. | |
| 7,144,468 B2 | 12/2006 | DeCristofaro et al. | |
| 7,230,359 B2 | 6/2007 | Iles-Klumpner | |
| 7,230,361 B2 | 6/2007 | Hirzel | |
| 7,315,102 B2 * | 1/2008 | Minagawa | 310/156.32 |
| 7,355,311 B2 * | 4/2008 | Shimizu | 310/156.37 |
| 7,679,260 B2 * | 3/2010 | Yamamoto et al. | 310/268 |
| 7,737,594 B2 * | 6/2010 | Abe et al. | 310/156.53 |
| 2004/0070307 A1 | 4/2004 | Haugan et al. | |
| 2005/0194855 A1 | 9/2005 | Hasebe et al. | |
| 2005/0285467 A1 | 12/2005 | Shimizu | |
| 2006/0028093 A1 | 2/2006 | Minagawa et al. | |
| 2006/0238056 A1 * | 10/2006 | Alvarez et al. | 310/156.35 |
| 2006/0273676 A1 | 12/2006 | Naruse et al. | |
| 2006/0284507 A1 | 12/2006 | Murakami | |
| 2007/0018520 A1 | 1/2007 | Kaneko et al. | |
| 2007/0080598 A1 | 4/2007 | Naruse | |
| 2007/0170802 A1 | 7/2007 | Potoradi | |
| 2008/0129136 A1 | 6/2008 | Abe et al. | |
| 2008/0290752 A1 | 11/2008 | Yamamoto et al. | |
| 2009/0295246 A1 | 1/2009 | Lee | |
| 2009/0243422 A1 | 10/2009 | Atarshi et al. | |
| 2009/0251021 A1 | 10/2009 | Atarshi et al. | |
| 2009/0295245 A1 | 12/2009 | Abe et al. | |
| 2010/0090555 A1 | 4/2010 | Tajima et al. | |
| 2010/0117474 A1 * | 5/2010 | Atarashi et al. | 310/156.43 |
| 2010/0141075 A1 | 6/2010 | Atarshi et al. | |
| 2010/0187933 A1 | 7/2010 | Yamamoto et al. | |
| 2010/0219710 A1 | 9/2010 | Kawamura et al. | |
| 2010/0231079 A1 | 9/2010 | Abe et al. | |

FOREIGN PATENT DOCUMENTS

| | | |
|---|---|---|
| EP | 1 850 451 A1 | 10/2007 |
| JP | 55-053161 A | 4/1980 |
| JP | 59-144352 A | 8/1984 |
| JP | 59-230453 | 12/1984 |
| JP | 02-079174 U | 6/1990 |
| JP | 6-500457 | 1/1994 |
| JP | 9-168263 | 6/1994 |
| JP | 6-205554 A | 7/1994 |
| JP | 10-164779 | 6/1998 |
| JP | 10-271784 A | 10/1998 |
| JP | 3062085 | 6/1999 |
| JP | 11-299199 | 10/1999 |
| JP | 11-511948 A T | 10/1999 |
| JP | 2000-197301 A | 7/2000 |
| JP | 2001-057753 A | 2/2001 |
| JP | 2001-136721 A | 5/2001 |
| JP | 2001-251817 | 9/2001 |
| JP | 2002-112481 A | 4/2002 |
| JP | 2005-143288 | 2/2005 |
| JP | 2005-094955 | 4/2005 |
| JP | 2005-269778 A | 9/2005 |
| JP | 2005-304245 A | 10/2005 |
| JP | 2005-318782 A | 11/2005 |
| JP | 2005-341696 A | 12/2005 |
| JP | 2006-25482 A | 1/2006 |
| JP | 2006-166635 | 6/2006 |
| JP | 2006-222131 A | 8/2006 |
| JP | 2000-262026 A | 9/2006 |
| JP | 2006-527578 T | 11/2006 |
| JP | 2006-345627 | 12/2006 |
| JP | 2007-028868 | 2/2007 |
| JP | 2007-37210 A | 2/2007 |
| JP | 2007-53844 A | 3/2007 |
| JP | 2007-089270 A | 4/2007 |
| JP | 2007-104819 A | 4/2007 |
| JP | 2007-151321 A | 6/2007 |
| JP | 2007-215291 A | 8/2007 |
| JP | 2008-022663 A | 1/2008 |
| JP | 2008-48497 A | 2/2008 |
| JP | 2008-104278 | 5/2008 |
| JP | 2008-167639 A | 7/2008 |
| WO | WO 92/20131 | 12/1992 |
| WO | WO 96/29774 A1 | 9/1996 |
| WO | WO 2004/109894 A1 | 12/2004 |
| WO | WO2006/077812 A1 | 7/2006 |
| WO | WO 2007/091727 A1 | 8/2007 |

* cited by examiner

AXIAL GAP MOTOR

CROSS-REFERENCED TO RELATED APPLICATION

This application is a National Stage entry of International Application No. PCT/JP2008/067908, filed Oct. 2, 2008, which claims priority to Japanese Patent Application No. P2007-261168, filed Oct. 4, 2007, the duty of disclosure of the prior application is incorporated in its entirety by reference.

FIELD OF THE INVENTION

The present invention relates to an axial gap motor.
Priority is claimed on Japanese Patent Application No. 2007-261168, the contents of which are incorporated herein by reference.

BACKGROUND ART

In a conventional art, for example, an axial gap permanent magnet synchronous apparatus including a pair of stators disposed opposite to each other to sandwich a rotor from both sides in a rotation axis direction, and forming a magnetic flux loop through the pair of stators for a field magnetic flux by a permanent magnet of the rotor is known (for example, refer to Japanese Unexamined Patent Application, First Publication No. H10-271784 and Japanese Unexamined Patent Application, First Publication No. 2001-136721.

DISCLOSURE OF THE INVENTION

Problems to be Solved by the Invention

However, in the above-described permanent magnet synchronous apparatus according to the conventional art, a field magnetic flux by a permanent magnet of a rotor is swept between a pair of stators so that the field magnetic flux straightly passes through the rotor. As a result, it is possible to reduce an amount of magnetic flux leakage in the rotor and increase an amount of an interlinkage magnetic flux interlinking stator windings of the stator.

In such a permanent magnet synchronous apparatus, it is necessary to prevent the permanent magnet synchronous apparatus from becoming complicated, prevent an increase in cost consumed by manufacture thereof, reduce eddy current loss due to an armature magnetic flux generated when current is applied to the stator to improve operation efficiency of a permanent magnet generator, and further increase the amount of the interlinkage magnetic flux interlinking the stator windings of the stator, thereby increasing torque potential.

This invention has been made in view of the above circumstances, and it is an object of the present invention to provide an axial gap motor capable of preventing its constitution from becoming complicated, preventing an increase in cost consumed by manufacture thereof, reducing eddy current loss generated when current is applied to improve operation efficiency, and further increasing an amount of an interlinkage magnetic flux interlinking stator windings of a stator.

Means for Solving the Problems

In order to solve the above problems, the present invention employs the following.

The present invention relates to an axial gap motor including a rotor rotatable about a rotation axis, and a stator disposed opposing to the rotor from at least one side in a rotation axis direction, wherein the rotor includes: a rotor frame including a plurality of ribs extending in a radial direction, an inner circumferential side annular shaft, and an outer circumferential side annular rim, which are integrally coupled to each other through the ribs; a plurality of main magnets magnetized in the rotation axis direction, and having a main magnet piece disposed between a pair of the ribs which are adjacent to each other in a circumferential direction; and a plurality of sub magnets magnetized in a direction perpendicular to the rotation axis direction and the radial direction, and having sub magnet pieces disposed on at least one side of the rib in the rotation axis direction, the shaft has shaft side rib mounting holes through which the ribs are mounted, the rim has rim side rib mounting holes through which the ribs are mounted, the ribs have radial inner ends mounted and fixed into the shaft side rib mounting holes and radial outer ends mounted and fixed into the rim side rib mounting holes, and in the rotor frame, the main magnets and the sub magnets are alternately disposed in the circumferential direction, between the shaft and the rim.

According to the axial gap motor of the present invention, in a rotor frame including a shaft coupled to an external drive shaft and to which torque is transmitted, and a rim connected to the shaft through a plurality of ribs, the ribs have radial inner ends mounted and fixed into shaft side rib mounting holes. Since radial outer ends are mounted and fixed into rim side rib mounting holes, it is possible to prevent the constitution of the rotor frame from becoming complicated. Therefore, for example, in comparison with the case that the entire rotor frame is manufactured by mechanical machining, since the rotor frame can be manufactured by assembling a plurality of non-magnetic members, it is possible to prevent an increase in cost consumed for manufacture thereof Moreover, since the rotor frame is made of a non-magnetic material, eddy current loss generated when current is applied can be reduced to improve operation efficiency. In addition, due to a magnetic flux lens effect by a so-called Halbach arrangement of the permanent magnet, magnetic fluxes of each of a main magnet piece and a sub magnet piece can be converged, thereby increasing an effective magnetic flux interlinking to the stator.

The radial inner end and the radial outer end of the rib may be caulkable with respect to the shaft and the rim, and at least one of the radial inner end and the radial outer end of the rib is integrally fixed to at least one of the shaft and the rim by caulking.

In this case, the rib can be fixed to the shaft and the rim by caulking. Therefore, it is possible to prevent the constitution of the rotor frame from being complicated, and readily integrally fix the shaft and the rim using the ribs.

The rib may have a hollow shape in a part from the radial inner end to the radial outer end.

In this case, by forming the rib in a hollow shape, magnetic insulation can be improved. Therefore, since magnetic fluxes of each of the magnetic pieces can be effectively utilized, and eddy current loss due to an armature magnetic flux generated when current is applied to the stators can be reduced, torque potential of the axial gap motor can be increased. Accordingly, since an excessive increase in temperature due to Joule heat can be prevented, operation efficiency of the axial gap motor can be improved.

At least one of the shaft and the rim may have a hollow shape.

In this case, by fanning at least one of the shaft and the rim in a hollow shape, magnetic insulation can be improved. Therefore, since magnetic fluxes of each of the magnetic pieces can be effectively utilized, and eddy current loss due to an armature magnetic flux generated when current is applied to the stators can be reduced, torque potential of the axial gap motor can be increased. Accordingly, since an excessive increase in temperature due to Joule heat can be prevented, operation efficiency of the axial gap motor can be improved.

The stator may have a pair of stators including a first stator and a second stator that are disposed opposing to each other in the rotation axis direction and sandwich the rotor from both sides in the rotation axis direction, and the sub magnet piece may include a pair of a first sub permanent magnet piece and a second sub permanent magnet piece that are contained between the shaft and the rim and disposed at both sides of the rib in the rotation axis direction.

In this case, due to a magnetic flux lens effect by a so-called Halbach arrangement of the permanent magnet by the main permanent piece, the first sub permanent magnet piece, and the second sub permanent magnet piece, magnetic fluxes can be appropriately converged.

Effects of the Invention

According to an axial gap motor of the present invention, in a rotor frame including a shaft coupled to an external drive shaft and to which torque is transmitted and a rim coupled to the shaft through a plurality of ribs, radial inner side ends of the ribs are mounted and fixed into shaft side rib mounting holes. Therefore, since radial outer side ends are mounted and fixed into rim side mounting holes, it is possible to prevent the constitution of the rotor frame from becoming complicated. Accordingly, for example, in comparison with the case that the entire rotor frame is manufactured by mechanical machining, since the rotor frame can be manufactured by assembling a plurality of non-magnetic members, it is possible to prevent an increase in cost consumed for manufacture thereof. Moreover, since the rotor frame is made of a non-magnetic material, eddy current loss generated when current is applied can be reduced to improve operation efficiency. In addition, due to a magnetic flux lens effect by a so-called Halbach arrangement of the permanent magnet, magnetic fluxes of each of a main magnet piece and a sub magnet piece can be converged, thereby increasing an effective magnetic flux interlinking to the stator.

DESCRIPTION OF REFERENCE NUMERALS

Figure 1:
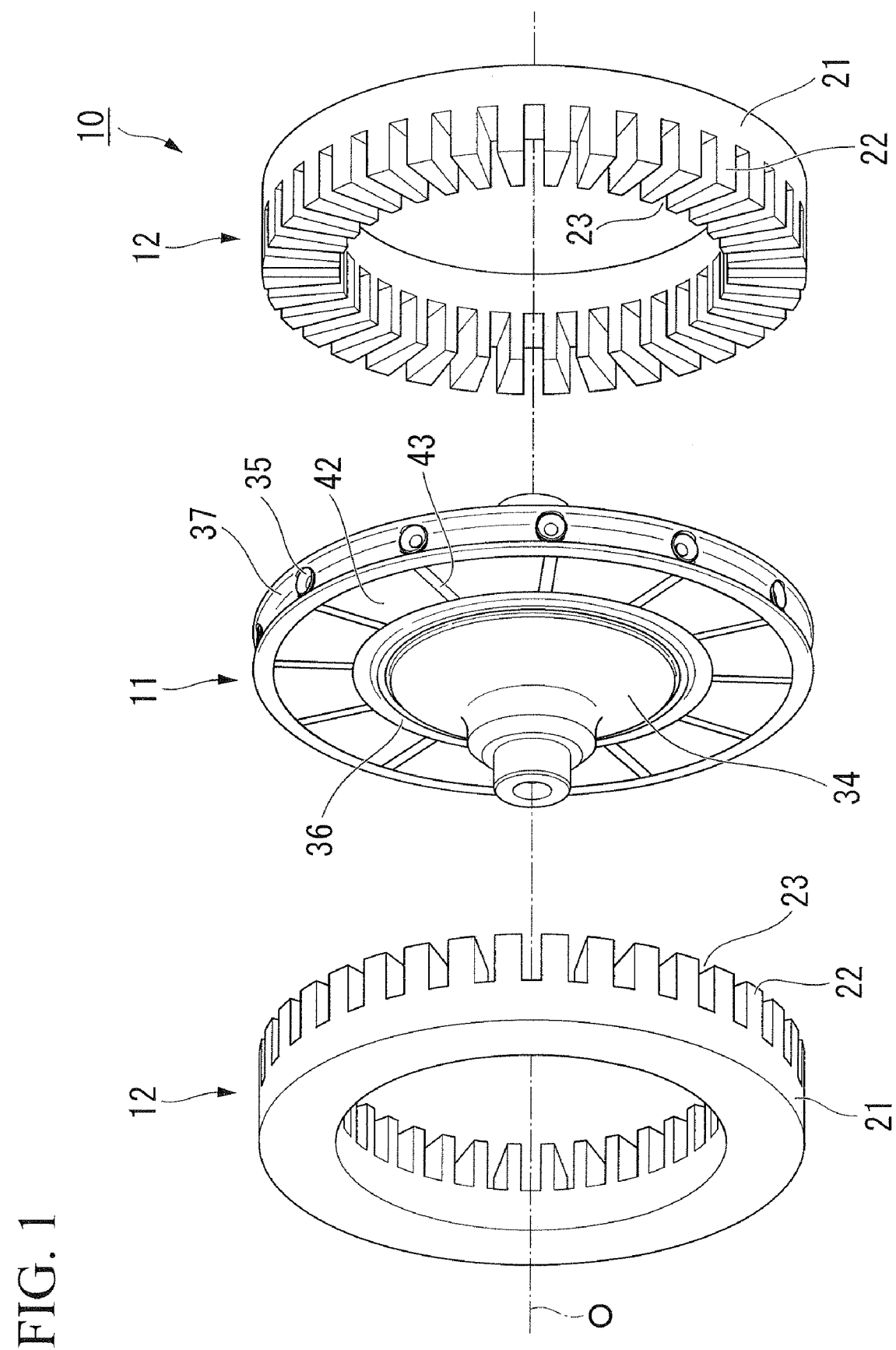
FIG. 1 is a perspective view of an axial gap motor according to an embodiment of the present invention.

10: Axial gap motor
11: Rotor
12: Stator (stator, first stator, second stator)
31: Main magnet pole (main magnet)
32: Sub magnet
33: Rotor frame
35: Radial rib (rib)
35a: Radial inner side end
35b: Radial outer side end
36: Shaft
36a: Shaft side rib mounting hole
37: Rim
37a: Rim side mounting hole
41: Main permanent magnet piece (main magnet piece)
43: Sub permanent magnet piece (sub magnet piece, first sub permanent magnet piece, second sub permanent magnet piece)

BEST MODE FOR CARRYING OUT THE INVENTION

Hereinafter, an axial gap motor according to an embodiment of the present invention will be described with reference to the accompanying drawings.

Figure 2:
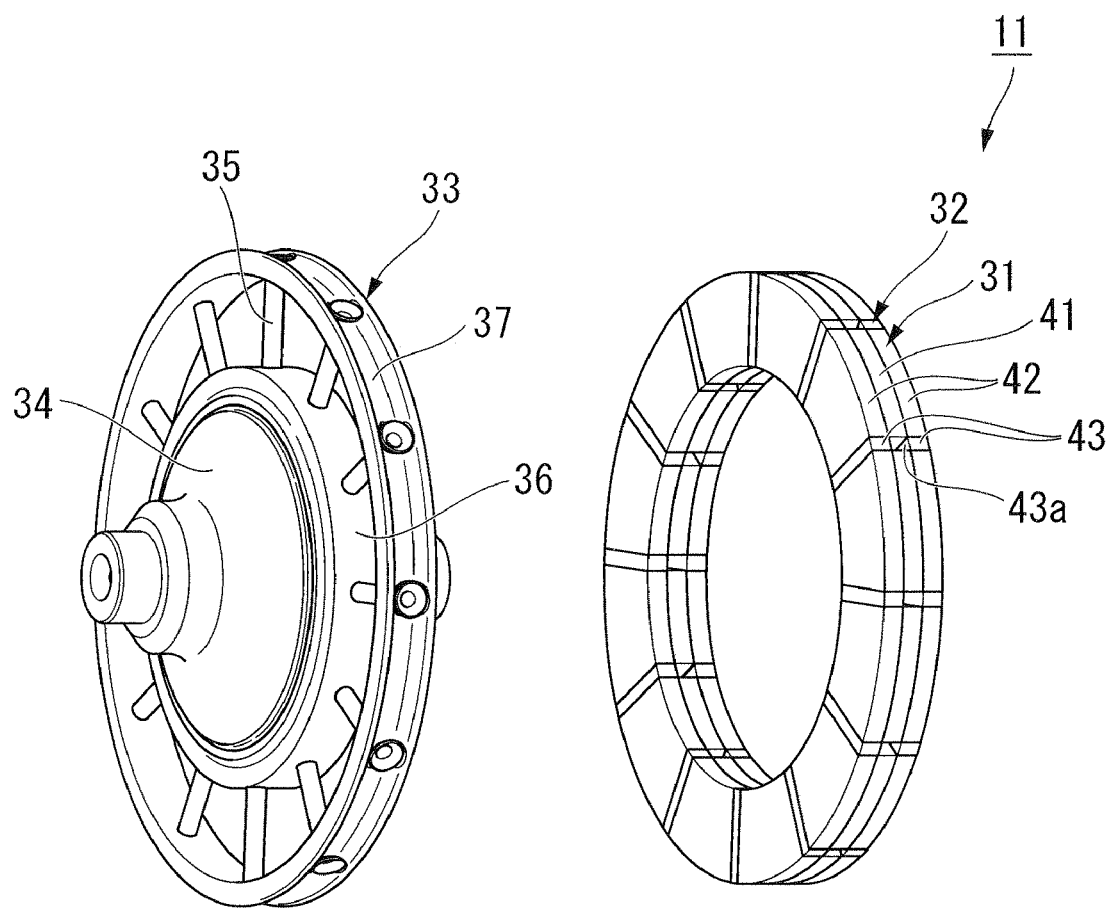
FIG. 2 is an exploded perspective view of a rotor of the axial gap motor.

An axial gap motor 10 according to the embodiment, for example, as shown in FIGS. 1 and 2, includes a substantially annular rotor 11, and a pair of stators 12 and 12. The rotor 11 is installed rotatably about a rotation axis O of the axial gap motor 10. In addition, the pair of stators 12 and 12 has stator windings with a plurality of phases that generates a rotating magnetic field for rotating the rotor 11.

The axial gap motor 10 is mounted as a drive source in, for example, a vehicle such as a hybrid vehicle or an electric vehicle, and has an output shaft coupled to an input shaft of a transmission (not shown in the figure), so that a drive force of the axial gap motor 10 is transmitted to drive wheels (not shown in the figure) of the vehicle through the transmission.

When a drive force is transmitted from the drive wheels to the axial gap motor 10 in deceleration of the vehicle, the axial gap motor 10 functions as a generator to generate a so-called regenerative brake force, thereby recovering kinetic energy of a vehicle body as the energy (regenerative energy). In addition, for example, in the hybrid vehicle, when a rotation shaft of the axial gap motor 10 is coupled to a crankshaft of an internal combustion engine (not shown in the figure), the axial gap motor 10 functions as a generator to generate the electric power generation energy, even when an output of the internal combustion engine is transmitted to the axial gap motor 10.

Each stator 12 includes a substantially annular plate-shaped yoke 21, a plurality of teeth 22, . . . , and 22, and stator windings (not shown in the figure) mounted between appropriate teeth 22 and 22. The plurality of teeth 22, . . . , and 22 project in a rotation axis O direction from positions at predetermined intervals in a circumferential direction on an opposite surface of the yoke 21, which is opposite to the rotor 11, toward the rotor 11 and also extend in a radial direction.

Each stator 12 is, for example, a 6N type having six main poles (for example, $U^+, V^+, W^+, U^-, V^-$ and $W^-$), which is set such that $U^+, V^+$ and $W^+$ poles of one stator 12 are opposite to $U^-, V^-$ and $W^-$ poles of the other stator 12 in the rotation axis O direction.

For example, in the pair of stators 12 and 12 opposite to each other in the rotation axis O direction, three teeth 22, 22 and 22 of one stator 12 corresponding to one sides of U+, V+ and W+ poles and U−, V− and W− poles are set to be opposite in the rotation axis O direction to three teeth 22, 22 and 22 of the other stator 12 corresponding to the other sides of U+, V+ and W+ poles and U−, V− and W− poles. In addition, a electric current state of the teeth 22 of one stator 12 and a electric current state of the teeth 22 of the other stator 12 that are opposite to each other in the rotation axis O direction are set to be in a reversed state in terms of electric angle.

For example, as shown in FIG. 2, the rotor 11 includes a plurality of main magnet poles 31, . . . , and 31, a plurality of sub magnets 32, . . . , and 32, a rotor frame 33 made of a non-magnetic material, and an output shaft 34 made of a magnetic material. The main magnet poles 31 and the sub magnets 32 are contained in the rotor frame 33 in a state in which they are alternately disposed in the circumferential direction.

The rotor frame 33 includes an inner circumferential side annular shaft 36 and an outer circumferential side annular rim 37, which are coupled by a plurality of radial ribs 35, . . . , and 35 disposed at predetermined intervals in the circumferential direction. The output shaft 34, coupled to an exterior drive shaft (for example, an input shaft, etc., of a transmission of a vehicle), is coupled to an inner circumferential portion of the shaft 36.

The main magnet pole 31 includes a substantially fan-like plate-shaped main permanent magnet piece 41 magnetized in a thickness direction (i.e., in the rotation axis O direction), and a pair of substantially fan-like plate-shaped magnetic members 42 and 42 to sandwich the main permanent piece 41 from both sides in the thickness direction. Each of the main permanent magnetic pieces 41 and 41 of the main magnet poles 31 and 31 adjacent to each other in the circumferential direction is set to have different magnetization directions.

The plurality of main magnet poles 31, . . . , and 31 contained in the rotor frame 33 are disposed to be sandwiched by the shaft 36 and the rim 37 from both sides in the radial direction and adjacent to each other through the radial ribs 35 in the circumferential direction.

In the rotor frame 33, the main permanent magnet pieces 41 of each main magnet pole 31 are sandwiched between two radial ribs 35 from both sides in the circumferential direction. A thickness of the main permanent magnetic piece 41 in the rotation axis O direction is equal to a thickness of the radial rib 35 in the rotation axis O direction.

The sub magnet 32 includes a pair of sub permanent magnet pieces 43 and 43 to sandwich the radial ribs 35 from both sides in the rotation axis O direction in the rotor frame 33. Each of the pair of sub permanent magnet pieces 43 and 43 opposite to each other in the rotation axis O direction is magnetized in a direction parallel to the rotation axis O direction and the radial direction (in substantially the circumferential direction) to form different magnetization directions.

A thickness of the sub permanent magnet piece 43 in the rotation axis O direction is equal to a thickness of the magnetic member 42 in the rotation axis O direction, and a circumferential width of the sub permanent magnet piece 43 is equal to a circumferential width of the radial rib 35.

In the rotor frame 33, the sub permanent magnet pieces 43 and 43 of the sub magnets 32 and 32 adjacent to each other in the circumferential direction sandwich the magnetic member 42 of the main magnet pole 31 from both sides in the circumferential direction.

In FIG. 2 separately showing the rotor frame 33 of the rotor 11 from other elements except the rotor frame 33 (i.e., the main magnet pole 31 and the sub magnet 32), spaces 43a in which the radial ribs 35 of the rotor frame 33 are designed to be disposed are formed between the pair of sub permanent magnet pieces 43 and 43 opposite to each other in the rotation axis O direction and between the main permanent magnet pieces 41 and 41 adjacent to each other in the circumferential direction.

The pair of sub permanent magnet pieces 43 and 43 opposite to each other in the circumferential direction through the magnetic member 42 have different magnetization directions.

The pair of sub permanent magnet pieces 43 and 43 disposed at one side in the rotation axis O direction are disposed to oppose their magnetic poles with the same polarity as that of one side of the main permanent magnet piece 41 magnetized in the rotation axis O direction. In addition, the pair of sub permanent magnet pieces 43 and 43 disposed at the other side in the rotation axis O direction are disposed to oppose magnetic poles with the same polarity as that of the other side of the main permanent magnet piece 41 magnetized in the rotation axis O direction.

That is, for example, in the main permanent magnet piece 41 having one side with an N polarity and the other side with an S polarity in the rotation axis O direction, the pair of sub permanent magnet pieces 43 and 43 sandwiching the magnetic member 42 from both sides in the circumferential direction at one side in the rotation axis O direction are disposed to face their respective N poles in the circumferential direction. In addition, the pair of sub permanent magnet pieces 43 and 43 sandwiching the magnetic member 42 from both sides in the circumferential direction at the other side in the rotation axis O direction are disposed to face their respective S poles in the circumferential direction.

Therefore, due to a magnetic flux lens effect by a so-called Halbach arrangement of the permanent magnet, magnetic fluxes of each of the main permanent magnet piece 41 and the sub permanent magnet pieces 43 and 43 are converged. As a result, effective magnetic fluxes interlinking to each of the stators 12 and 12 can be relatively increased.

For example, as shown in FIGS. 3 to 7, in the rotor frame 33, the shaft 36 has shaft side rib mounting holes 36a as through-holes through which the radial ribs 35 are mounted, and the rim 37 includes rim side rib mounting holes 37a as through-holes through which the radial ribs 35 are mounted.

Figure 6:
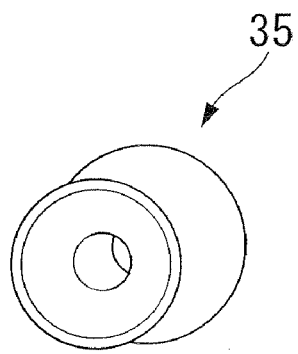
FIG. 6 is a perspective view of a major part of a radial rib of the rotor frame of the axial gap motor.
Figure 7:
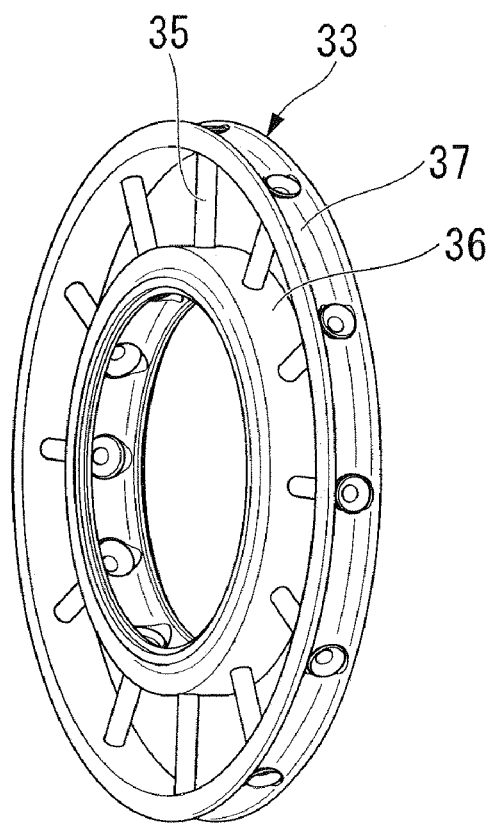
FIG. 7 is a perspective view of the rotor frame of the axial gap motor.

For example, as shown in FIG. 6, the radial rib 35 has a hollow cylindrical shape, and a radial inner end 35a that is caulkable is mounted in the shaft side rib mounting hole 36a, and a radial outer end 35b that can be caulked is mounted in the rim side rib mounting hole 37a.

Figure 4:
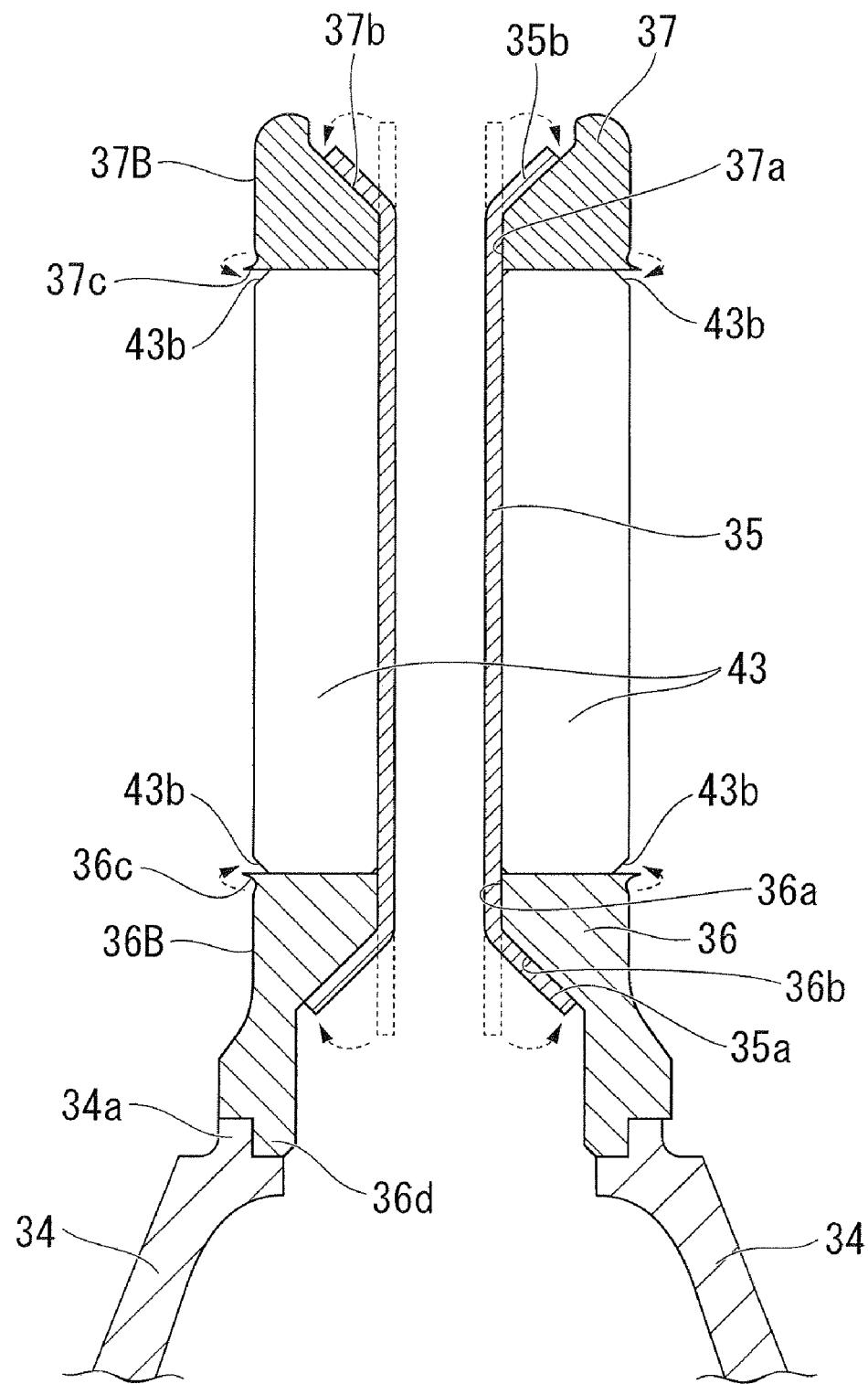
FIG. 4 is a cross-sectional view of a major part of the rotor of the axial gap motor.

For example, as shown in FIG. 4, the radial inner end 35a of the radial rib 35 mounted in the shaft side rib mounting hole 36a is caulked, with an inner diameter of the radial inner end 35a gradually increased from the radial outside toward the radial inside thereof. Therefore, the radial rib 35 is fixed to the shaft 36. In addition, for example, the radial rib 35 may be coupled to the shaft 35 by welding, etc.

Similarly, the radial outer end 35b of the radial rib 35 mounted in the rim side mounting hole 37a is caulked, with an inner diameter of the radial outer end 35b gradually increased from the radial inside toward the radial outside thereof. Therefore, the radial rib 35 is fixed to the rim 37. In addition, for example, the radial rib 35 is coupled to the rim 37 by welding, etc.

An inner circumferential surface 36A of the shaft 36 has a concave surface in which a central part in the rotation axis O direction is curved inward in the radial direction. In addition, an outer circumferential surface 37A of the rim 37 has a concave surface in which a central part in the rotation axis O direction is curved outward in the radial direction.

On the inner circumferential surface 36A of the shaft 36, an open end 36b of the shaft side rib mounting hole 36a has a tapered surface having a diameter that gradually increases from the radial outside toward the radial inside thereof. On the outer circumferential surface 37A of the rim 37, an open end 37b of the rim side rib mounting hole 37a has a tapered surface having a diameter that gradually increases from the radial inside toward the radial outside thereof. In addition, the ends 35a and 35b of the caulked radial rib 35 are in contact with the open ends 36b and 37b.

For example, as shown in FIG. 4, an outer circumferential side end 36c of an axial end 36B of the shaft 36 in the rotation axis O direction and an inner circumferential side end 37c of an axial end 37B of the rim 37 in the rotation axis O direction can be caulked. The caulked ends 36c and 37c are in contact either with chamfered parts (not shown in the figure) formed at both radial outer ends of the magnetic member 42 of the main magnet pole 31 in the rotation axis O direction or chamfered parts 43b formed at both radial outer ends of the sub permanent magnet piece 43 of the sub magnet 32 in the rotation axis O direction.

That is, the plurality of main magnet poles 31, . . . , and 31 and the plurality of sub magnets 32, . . . , and 32 contained in the rotor frame 33 are fixed by caulking the ends 36c and 37c of the shaft 36 and the rim 37.

Figure 3:
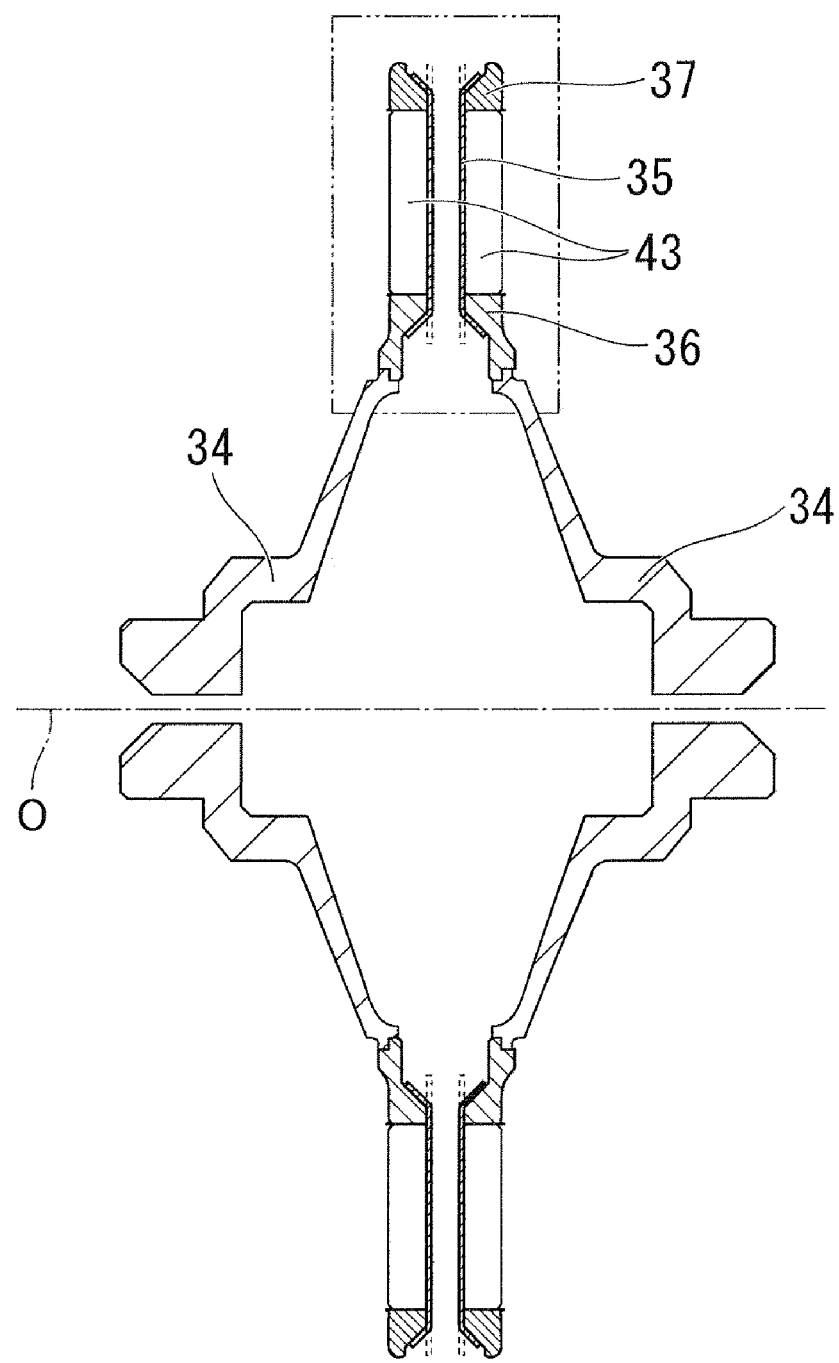
FIG. 3 is a cross-sectional view of the rotor of the axial gap motor.
Figure 5:
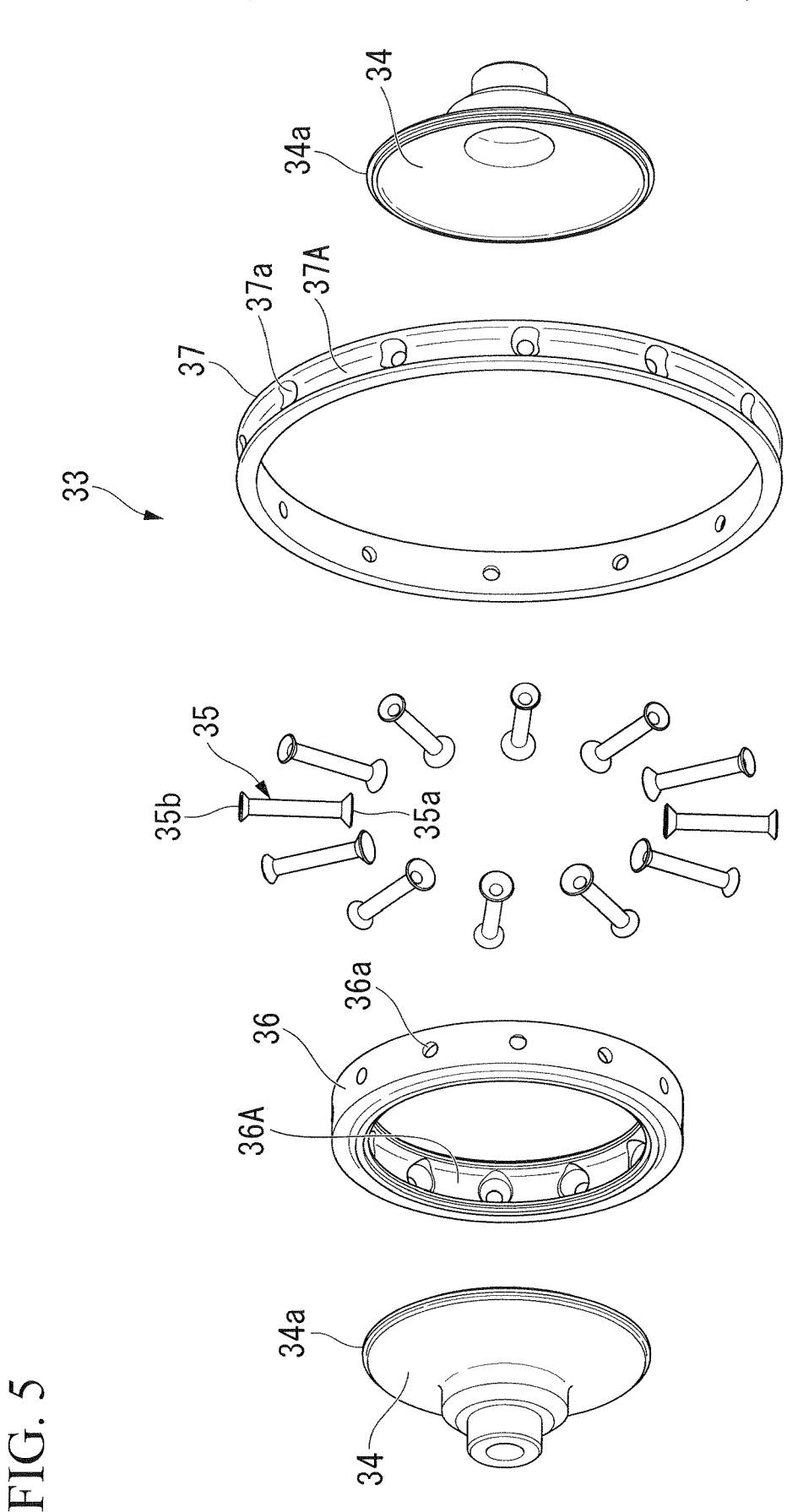
FIG. 5 is an exploded perspective view of a rotor frame of the axial gap motor.

For example, as shown in FIGS. 3 to 5, the output shaft 34 has substantially a disc shape projecting outward in the rotation axis O direction from the radial outside toward the radial inside thereof. An outer circumferential portion 34a of the output shaft 34 and an inner circumferential side axial end 36d as an inner circumferential side end of the shaft 36 in the rotation axis O direction have shapes that can be press-fitted to each other, and for example, coupled to each other by welding, etc.

As described above, according to the axial gap motor 10 according to the embodiment, by fixing the shaft 36 and the rim 37 sandwiched from both sides in the radial direction by the radial ribs 35 mounted in each of the rib mounting holes 36a and 37a, it is possible to prevent the constitutions of the plurality of main magnet poles 31, . . . , and 31 and the plurality of sub magnets 32, . . . , and 32 contained in the rotor frame 33 from becoming complicated. For example, in comparison with the case in which the entire rotor frame 33 in which the shaft 36, the rim 37 and the radial ribs 35 are integrally formed with each other is manufactured by mechanical machining, the rotor frame 33 can be manufactured by assembling a plurality of non-magnetic members. Therefore, it is possible to prevent an increase in cost consumed for manufacture thereof.

In addition, since the radial ribs 35 can be fixed to the shaft 36 and the rim 37 by caulking, it is possible to prevent the constitution of the rotor frame 33 from becoming complicated, and readily integrally fix the shaft 36 and the rim 37 using the radial ribs 35.

Further, by forming the radial rib 35 in a hollow shape, magnetic insulation can be improved, magnetic fluxes of each of the magnetic pieces 41 and 43 can be effectively utilized, and eddy current loss due to an armature magnetic flux generated when current is applied to the stators 12 can be reduced. Further, torque potential of the axial gap motor 10 can be increased, and an excessive increase in temperature due to Joule heat can be prevented. As a result, operation efficiency of the axial gap motor 10 can be improved.

Moreover, since the main magnet pole 31 and the sub magnet 32 are fixed to the rotor frame 33 by the caulked ends 36c and 37c of the shaft 36 and the rim 37, it is possible to prevent thermal deterioration of a magnetic path generated when they are fixed by welding.

Moreover, only the members positioned adjacent to the main magnet pole 31 and the sub magnet 32 (i.e., the radial ribs 35, the shaft 36 and the rim 37) are made of a non-magnetic material, and the output shaft 34, etc., not contributing the magnetic path, is made of other structural materials except the non-magnetic material (for example, a magnetic material). Therefore, it is possible to prevent an increase in cost consumed for the constitution of the axial gap motor 10, while securing a desired magnetic path.

Figure 8:
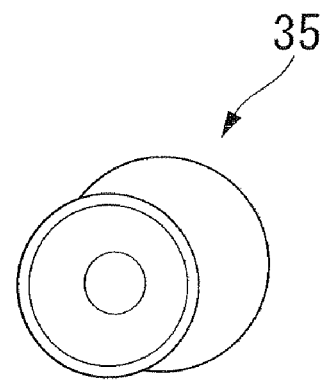
FIG. 8 is a perspective view of a major part of a radial rib of a rotor frame according to a first modified example of the axial gap motor.
Figure 9:
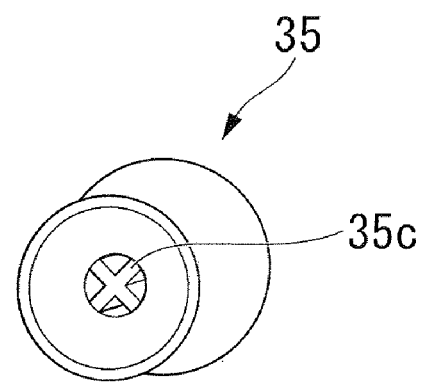
FIG. 9 is a perspective view of a major part of a radial rib of a rotor frame according to a second modified example of the axial gap motor.

In the above-described embodiment, while the radial rib 35 has a hollow cylindrical shape, it is not limited thereto, but may, for example, as shown in FIG. 8, have a solid column shape. In addition, for example, as shown in FIG. 9, the radial rib 35 has a hollow cylindrical shape and may include beam-like members 35c disposed at different positions on an inner circumferential surface thereof.

Figure 10:
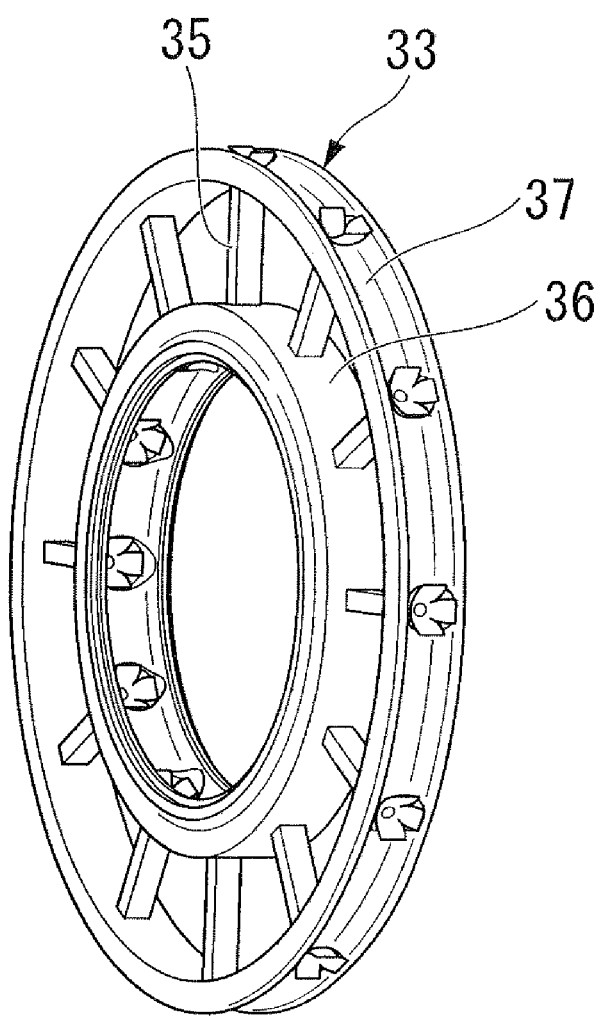
FIG. 10 is a perspective view of a rotor frame according to a third modified example of the axial gap motor.

Further, for example, as shown in FIG. 10, the radial rib 35 may have a square cylindrical shape or a rectangular column shape having a substantially rectangular cross-section in the radial direction.

In the above-described embodiment, at least one of the shaft 36 and the rim 37 may have a hollow shape.

In this case, magnetic insulation can be improved, magnetic fluxes of each of the magnetic pieces 41 and 43 can be effectively utilized, and eddy current loss due to an armature magnetic flux generated when current is applied to the stators 12 can be reduced. In addition, torque potential of the axial gap motor 10 can be increased, and an excessive increase in temperature due to Joule heat can be prevented. As a result, operation efficiency of the axial gap motor 10 can be improved.

In the above-described embodiment, the stators 12 may be installed at any one side in the rotation axis O direction, and the sub magnet 32 may have the sub permanent magnet pieces 43 provided at any one side in the rotation axis O direction.

The invention claimed is:

1. An axial gap motor including a rotor rotatable about a rotation axis, and a stator disposed opposing to the rotor from at least one side in a rotation axis direction, wherein the rotor comprises:
a rotor frame including a plurality of ribs extending in a radial direction, an inner circumferential side annular shaft, and an outer circumferential side annular rim, which are integrally coupled to each other through the ribs;
a plurality of main magnets magnetized in the rotation axis direction, and having a main magnet piece disposed between a pair of the ribs which are adjacent to each other in a circumferential direction; and
a plurality of sub magnets magnetized in a direction perpendicular to the rotation axis direction and the radial direction, and having sub magnet pieces disposed on at least one side of the rib in the rotation axis direction,
the shaft has shaft side rib mounting holes through which the ribs are mounted,
the rim has rim side rib mounting holes through which the ribs are mounted,
the ribs have radial inner ends mounted and fixed into the shaft side rib mounting holes and radial outer ends mounted and fixed into the rim side rib mounting holes, and
in the rotor frame, the main magnets and the sub magnets are alternately disposed in the circumferential direction, between the shaft and the rim.

2. The axial gap motor according to claim 1, wherein the radial inner end and the radial outer end of the rib are caulkable with respect to the shaft and the rim, and at least one of the radial inner end and the radial outer end of the rib is integrally fixed to at least one of the shaft and the rim by caulking.

3. The axial gap motor according to claim 1, wherein the rib has a hollow shape in a part from the radial inner end to the radial outer end.

4. The axial gap motor according to claim 1, wherein at least one of the shaft and the rim has a hollow shape.

5. The axial gap motor according to claim 1, wherein the stator has a pair of stators including a first stator and a second stator that are disposed opposing to each other in the rotation axis direction and sandwich the rotor from both sides in the rotation axis direction, and the sub magnet piece includes a pair of a first sub permanent magnet piece and a second sub permanent magnet piece that are contained between the shaft and the rim and disposed at both sides of the rib in the rotation axis direction.

* * * * *